(12) United States Patent
Brown et al.

(10) Patent No.: US 12,430,230 B2
(45) Date of Patent: Sep. 30, 2025

(54) PARTITION BASED STRUCTURAL COVERAGE HIT-MAP COLLECTION FROM HARDWARE TRACE DATA

(71) Applicant: Honeywell International Inc., Charlotte, NC (US)

(72) Inventors: Vernon Ray Brown, Phoenix, AZ (US); Vamsi Karthik Gudaru, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 196 days.

(21) Appl. No.: 18/326,602

(22) Filed: May 31, 2023

(65) Prior Publication Data
US 2024/0354231 A1 Oct. 24, 2024

(30) Foreign Application Priority Data
Apr. 18, 2023 (IN) .............................. 202311028229

(51) Int. Cl.
*G06F 11/3668* (2025.01)
*G06F 11/362* (2025.01)

(52) U.S. Cl.
CPC ........ *G06F 11/3676* (2013.01); *G06F 11/364* (2013.01)

(58) Field of Classification Search
None
See application file for complete search history.

(56) References Cited

U.S. PATENT DOCUMENTS

| | | |
|---|---|---|
| 9,880,925 B1 | 1/2018 | Bienkowski et al. |
| 10,725,893 B2 | 7/2020 | Fazunenko et al. |
| 2009/0164979 A1* | 6/2009 | Fischer ............... G06F 11/3495 717/128 |

(Continued)

FOREIGN PATENT DOCUMENTS

| | | |
|---|---|---|
| CN | 112699036 A | 4/2021 |
| CN | 114416545 A | 4/2022 |

OTHER PUBLICATIONS

Damien et al. "Implementation of a Host-based Intrusion Detection System for Avionic Applications", 2019 OEEE 24th Pacific Rim International Symposium on Dependable Computing (PRDC), Dec. 1, 2019, pp. 178 through 187.

(Continued)

*Primary Examiner* — Qing Chen
(74) *Attorney, Agent, or Firm* — Fogg & Powers LLC (57) ABSTRACT

Embodiments include at least one processor configured to execute a trace data analyzer (TDA) application during at least one partition of an execution cycle. The processor(s) execute the TDA application to process raw trace data acquired for an application. The TDA application is executed during at least one partition of the execution cycle in which the application to be tested is not scheduled for execution. When executing the TDA application, the processor(s) generate a hit-map based on the raw trace data, which can be stored in memory or updated. When requested by a host system, the hit-map can be sent via a communication link. In executing the TDA application, the application is not interrupted during testing and raw trace data can be processed using local system software.

20 Claims, 4 Drawing Sheets

(56) References Cited

U.S. PATENT DOCUMENTS

| | | | |
|---|---|---|---|
| 2009/0204949 A1* | 8/2009 | Howland | G06F 11/3466 717/128 |
| 2009/0287729 A1 | 11/2009 | Chen et al. | |
| 2010/0138811 A1* | 6/2010 | Jayaraman | G06F 11/3476 717/125 |
| 2013/0166271 A1 | 6/2013 | Danielsson et al. | |
| 2014/0019598 A1* | 1/2014 | Krajec | H04L 67/1001 709/220 |
| 2014/0019756 A1* | 1/2014 | Krajec | H04L 63/0428 713/167 |
| 2014/0019985 A1* | 1/2014 | Krajec | G06F 9/4806 718/102 |
| 2014/0025572 A1* | 1/2014 | Krajec | G06F 11/3636 705/40 |
| 2018/0129589 A1* | 5/2018 | O'Dowd | G06F 17/40 |
| 2019/0303270 A1* | 10/2019 | Hoermann | G06F 11/3664 |

OTHER PUBLICATIONS

European Patent Office, "Extended European Search Report", dated Oct. 1, 2024, from U.S. Appl. No. 18/326,602, from Foreign Counterpart to U.S. Appl. No. 18/326,602, pp. 1 through 10, Published: EP.

Yoon et al. "Memory Heat Map: Anomaly Detection in Real-Time Embedded Systems Using Memory Behavior", 2015 52nd ACM/EDAC/IEEE Design Automation Conference (DAC), IEEE, Jun. 8, 2015, pp. 1 through 6.

Amd, "Zynq UltraScale+ Device Technical Reference Manual (UG1085)", downloaded Jan. 24, 23 from https://docs.xilinx.com/internal/api/webapp/print/a64a31ce-6652-486c-8633-010444ef9ec9, pp. 1 through 16.

Arm, "CoreSight™ Trace Memory Controller Technical Reference Manual", ARM DDI 0641B, Revision: r0p1, downloaded Jan. 24, 2023 from https://developer.arm.com/documentation/ddi0461/b/, pp. 1 through 116.

Lauterbach Development Tools, "ARM-ETM Trace Manual", Release Sep. 2022, pp. 1 through 160.

Lauterbach Development Tools, "PowerView User's Guide Manual", Release Sep. 2022, pp. 1 through 127.

RTCA, "DO-178C Training—Software Considerations in Airborne Systems and Equipment Certification", downloaded Jan. 24, 2023 from https://www.rtca.org/training/do-178c-training/, pp. 1 through 10.

* cited by examiner

PARTITION BASED STRUCTURAL COVERAGE HIT-MAP COLLECTION FROM HARDWARE TRACE DATA

CROSS-REFERENCE TO RELATED APPLICATION

This application claims priority to Indian Application No. 202311028229 filed on Apr. 18, 2023, same title herewith, the contents of which are incorporated herein in its entirety.

BACKGROUND

Structural coverage analysis is used in avionics software development guidance to ensure adequate testing of the software. One method of conducting structural coverage analysis is to collect object code traces for the software that is being tested. Object code traces, otherwise known as trace data, are generated from program execution and contain information on which instructions were executed.

Trace data collection and analysis is conventionally performed using dedicated external circuitry to process the trace being streamed out. The trace data can be collected in the target system memory. However, this approach to trace data collection and analysis in hardware system memory can be inefficient, since the characteristics of the application that is being tested are not taken into account when collecting and analyzing the trace data. For example, one problem with existing techniques is that execution of the application must be stopped during collection and analysis in order to free up resources on the hardware.

Therefore, a need exists to improve the collection and analysis of trace data from executing software applications.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment a system is disclosed. The system comprises at least one processor coupled to a computing circuit. The at least one processor is configured to execute at least a portion of at least one application for an execution cycle defined by a plurality of partitions. The computing circuit is configured to generate first raw trace data that corresponds to trace information from executing the at least one application during a first partition of the plurality of partitions. The system comprises a memory coupled to the at least one processor. The memory is configured to store the first raw trace data. The at least one processor is configured to execute a trace data analyzer application for at least one other partition of the plurality of partitions. The at least one other partition is subsequent to the first partition. By executing the trace data analyzer application, the at least one processor is configured, for the at least one other partition, to retrieve the first raw trace data stored in the memory, generate a hit-map based on the first raw trace data, and store the hit-map in the memory.

In another embodiment, a method is disclosed. The method comprises executing, during a first partition of a plurality of partitions, at least a portion of at least one application. The method comprises executing a trace data analyzer application for at least one other partition of the plurality of partitions subsequent to the first partition. Executing the trace data analyzer application comprises retrieving first raw trace data that corresponds to trace information from executing the at least one application during the first partition, generating a hit-map for the at least one application based on the first raw trace data, and storing the hit-map in a memory.

In yet another embodiment, a program product is disclosed. The program product comprises a non-transitory computer readable medium having program instructions stored thereon. When executed by at least one processor, the program instructions cause the at least one processor to execute, for a first partition of a plurality of partitions, at least a portion of at least one application. The program instructions cause the at least one processor to execute a trace data analyzer application for at least one other partition of the plurality of partitions. Executing the trace data analyzer application causes the at least one processor to retrieve first raw trace data that corresponds to trace information from executing the at least one application during the first partition, generate a hit-map based on the first raw trace data, and store the hit-map in a memory.

Other embodiments are also disclosed, as subsequently described.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly referenced below and as described further in the accompanying detailed description.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
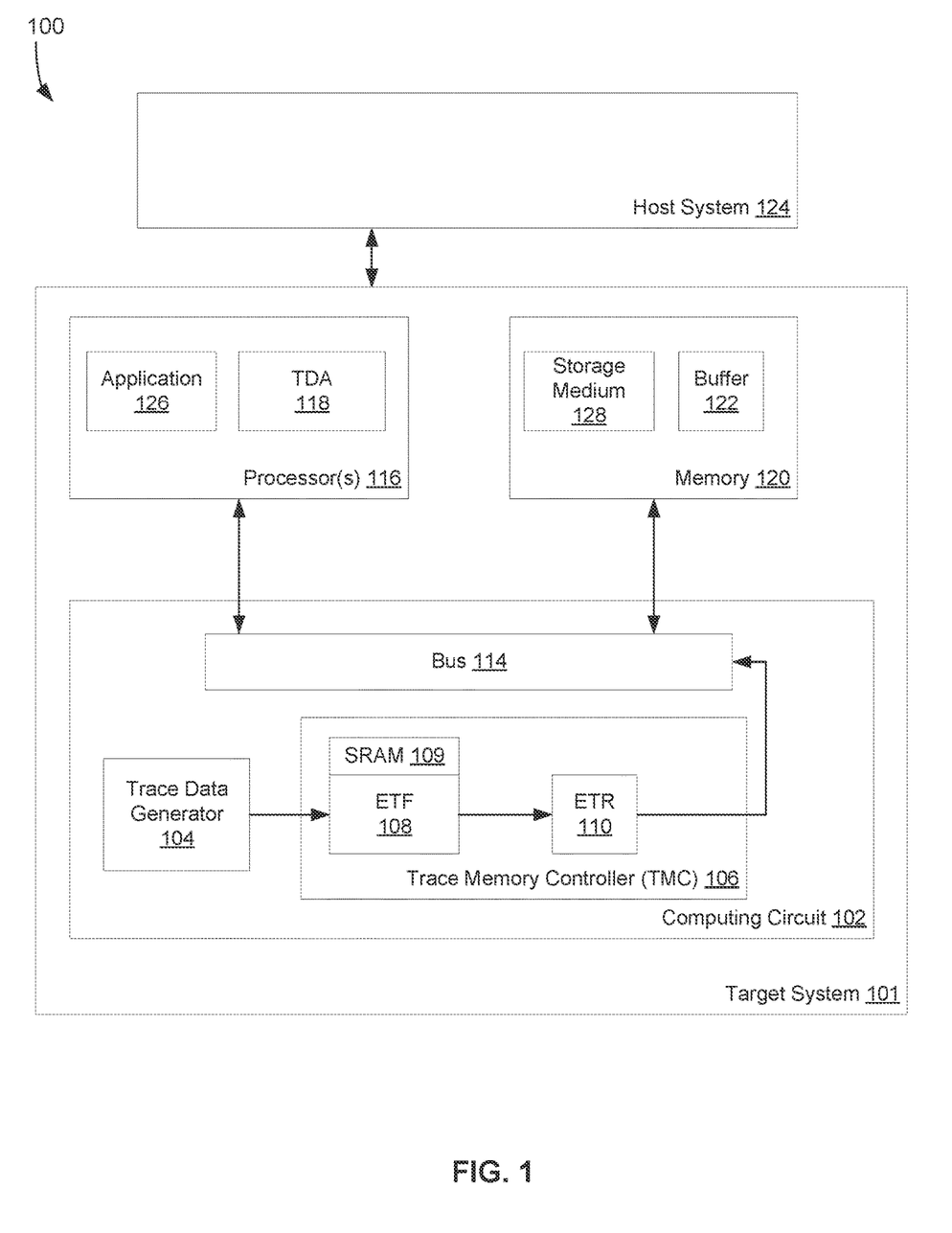
FIG. 1 depicts a block diagram of an exemplary system configured for performing trace data analysis for at least one application, as described in one or more embodiments.

FIG. 1 depicts a block diagram of an exemplary system configured for performing trace data analysis for at least one application. The system 100 includes a target system 101 comprising at least one processor 116 coupled to a computing circuit 102. The target system 101 is coupled via a communication link to a host system 124. Processor 116 is also coupled to a memory 120, for example, by a bus 114. For pedagogical explanation processor 116 is described as a single processor, although any number of processors can be used. In some examples, processor 116 and memory 120 is integrated with the computing circuit 102 or, as illustrated in FIG. 1, are implemented as discrete components in the target system 101.

Processor 116 may include any one or combination of processors, microprocessors, digital signal processors, application specific integrated circuits, field programmable gate arrays, and/or other similar variants thereof. Processor 116 may also include, or function with, software programs, firmware, or other computer readable instructions for carrying out various process tasks, calculations, and control functions, used in the methods described below. These instructions are tangibly embodied on any storage media (or computer readable media) used for storage of computer readable instructions or data structures.

Memory 120 includes a computer readable medium that can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), on chip memory (OCM), and flash memory, etc. Suitable processor-readable media may also include transmission media such as electrical, electromagnetic, or digital signals, conveyed via a communication medium such as a network and/or a wireless link.

Processor 116 generally functions to execute one or more applications 126 provided by the target system 101. The application(s) 126 each include program instructions that configure the processor 116 to perform one or more application-specific functions. For example, in the avionics context, the target system 101 functions as an avionics device communicatively coupled to an aircraft. In this example, the target system 101 provides one or more avionics applications to the processor 116, which contain instructions to the at least one processor 116 for generating a communications message, determining one or more navigation parameters related to the aircraft, configuring one or more sensors onboard the aircraft, or other tasks.

In some examples, the application-specific functions are scheduled by the target system 101 to be executed at various timing intervals by the processor 116. Such timing intervals are referred to as "execution cycles" and typically are on the order of 100 ms. Each execution cycle is defined by a plurality of sub-intervals referred to as "partitions"; each partition is typically on the order of 12.5 ms. Processor 116 is configured to perform the application-specific functions of the application 126 for at least one of these partitions, the number of which depend on the type of application, the timing allocated by each partition, and the processing capabilities of the processor 116. The scheduling of the applications 126 to the processor 116 is configured by the target system 101 and is defined before the processor 116 begins executing the application 126. In one example, the target system 101 utilizes a scheduler to assign tasks (e.g., threads) of the application 126 in sequential order for execution during a partition.

For at least some applications 126 executed by processor 116, it is desirable for the target system 101 to monitor the execution of the application as it is being executed by the processor 116. Information related to the execution order of the application's program instructions is referred to as "trace information". While the program instructions that comprise the application tell the processor what application-specific functions to perform, trace information, in contrast, provides context on the flow of the program execution. Such information can be used to diagnose and troubleshoot the application.

System 100 is configured, by computing circuit 102, to generate trace data that corresponds to trace information from executing an application 126 on the processor 116. Trace data as used herein means data that describes the instruction execution order of an application. Computing circuit 102 includes a trace data generator 104 configured to generate trace data from the application 126. The trace data generator 104 provides the trace data to an embedded trace first-in-first-out (ETF) 108. ETF 108 includes a storage medium such as a static random access memory (SRAM) 109 configured to store, at least temporarily, the trace data from trace data generator 104. When the trace data is ready for further processing, it is retrieved from the SRAM 109 and provided to an embedded trace router 110. The ETR 110 routes the trace data to a communication bus 114 that connects the computing circuit 102 to the processor 116 and memory 120. In some examples, the ETF 108 and ETR 110 form components of a trace memory controller (TMC) 106, which sends the trace data and appropriate control signals to the memory 120 for storing the trace data.

Memory 120 is configured to store the trace data generated by the computing circuit 102. The trace data generated by computing circuit 102 is referred to herein as "raw trace data" because it represents the data that is responsively generated by executing the application 126. The raw trace data generated by computing circuit 102 and stored in memory 120 has not yet undergone higher level processing into a hit-map. In the embodiment of FIG. 1, memory 120 includes a memory buffer 122 and a storage medium 128. The buffer 122 is configured for temporary storage of the raw trace data before analysis and processing. In some examples, buffer 122 is a synchronous dynamic random-access memory (SDRAM) storage unit.

In conventional hardware-based trace data compiler systems, the generation and analysis of trace data may conflict with the applications that are executed to generate said trace data. In some conventional systems, the raw trace data is generated by the computing circuit 102 and streamed over an output port to an external proprietary trace data compiler to process the raw trace data. Although this approach eventually processes the raw trace data, it is hindered by methodological and processing limitations since for many applications the amount of raw trace data is simply too large and requires high speed post processing to avoid data loss (which for some mission-critical applications may even render this approach unusable). In other conventional systems, the raw trace data is stored by a dedicated RAM (e.g., SRAM 109 of ETF 108) and is processed by a separate process. In this approach, however, the limited storage availability of the RAM requires that the computing circuit 102 interrupts the execution of the application. This is done in order to collect the raw trace data from the RAM so that additional raw trace data can be stored in the RAM (or else risk losing the stored trace data). This approach thus slows down the execution of application 126 and potentially compromises the application each time the processing entity retrieves the stored trace data.

Target system 101 is configured to generate and process the raw trace data without interrupting execution of the application 126 and can process the raw trace data faster than conventional approaches. Processor 116 includes, or is configured to execute, a trace data application (TDA) 118. The TDA 118 can be embodied as a program product comprising a non-transitory computer readable medium that embodies program instructions. When executed by processor 116, TDA 118 causes the processor to perform retrieval and processing of the raw trace data that corresponds to one or more applications 126. Processor 116 is configured to execute TDA 118 during partitions in which the applications 126 are not scheduled for execution. In some examples, processor 116 determines the partition(s) in which the applications 126 are scheduled for execution (as determined by the scheduling information provided by the target system 101) and executes TDA 118 in an immediately subsequent partition. The partition in which the TDA 118 is executed can be a spare partition available in the execution cycle, such as an ARINC-653 partition as defined by the Aeronautical Radio, Inc. (ARINC) industry standards.

Figure 2:
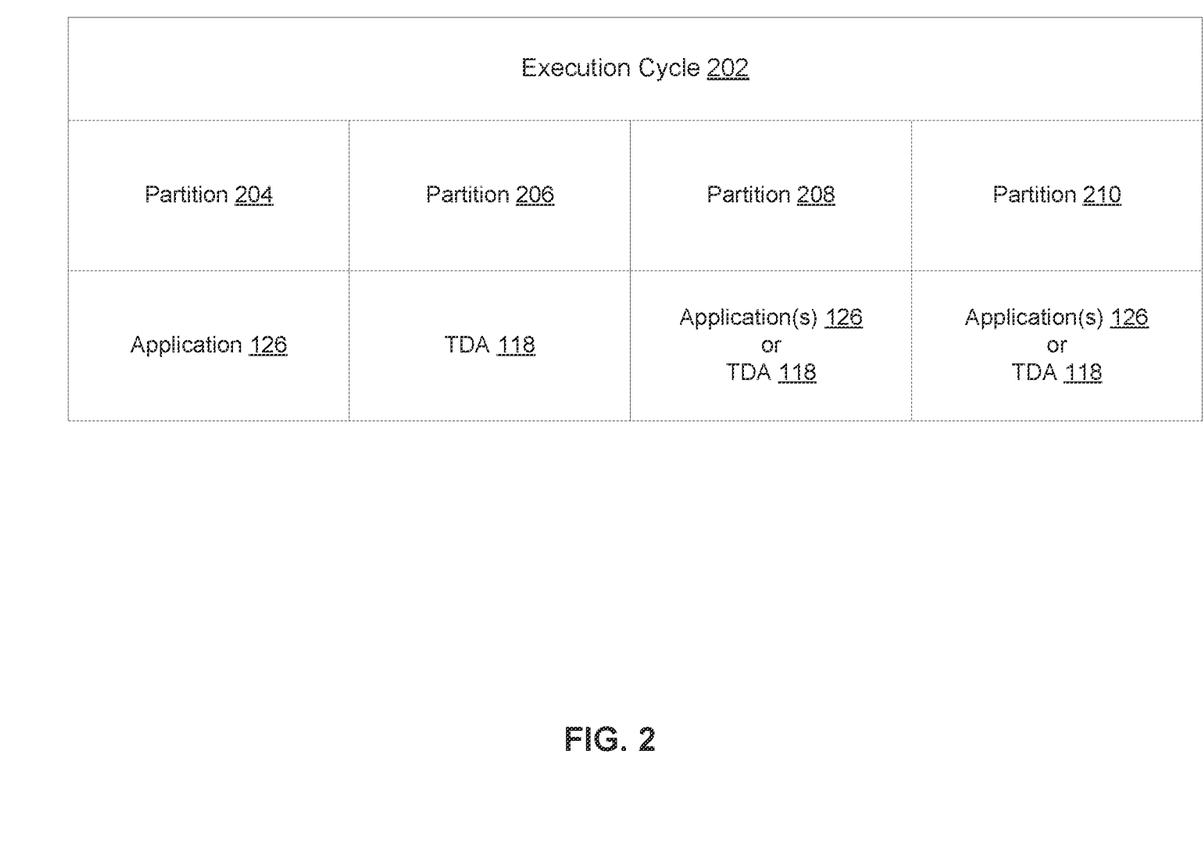
FIG. 2 depicts a block diagram of an exemplary execution cycle scheduled for execution by at least one processor, as described in one or more embodiments.

One example of a timing sequence by processor 116 is depicted in FIG. 2. In FIG. 2, processor 116 allocates its processing resources to complete each execution cycle 202, which defines a period of time. The execution cycle 202 includes a first partition 204, a second partition 206, a third partition 208, and a fourth partition 210. Each partition defines a sub-interval of time (typically on the order of a few milliseconds). Processor 116 completes the execution cycle 202 by processing each partition in sequence such that first partition 204 is performed first, followed by second partition 206, followed by third partition 208, and processes fourth partition 210 last in the sequence. The execution cycle 202 is exemplary and may comprise more or fewer partitions.

During the first partition, processor 116 is configured to execute an application 126 (e.g., an avionics application). In executing the application 126, computing circuit 102 is configured to generate raw trace data that corresponds to the application 126 in parallel with execution by the processor 116. This raw trace data needs to be processed into a hit-map before it is sent to a host system 124. Referring to FIGS. 1 and 2, the application 126 is scheduled to finish execution during the first partition 204; however, in other examples the application 126 may take additional partitions to complete. In the second partition 206, processor 116 executes the TDA 118 for collecting and processing the raw trace data generated during the previous partition. After the second partition 206, processor 116 can proceed depending on the scheduled use of its processing resources. If the application 126 is large and facilitates a large amount of raw trace data, then processor 116 can continue to execute the TDA 118 during the third partition to finish processing of the raw trace data. If the raw trace data processing is completed during the second partition 206, and/or if another application is scheduled for execution, then processor 116 executes another of the applications 126 during the third partition 208. The scheduling and execution of the TDA 118 is adaptive to the applications 126 and does not interrupt the scheduled execution of the applications 126 that require structural coverage testing.

The fourth partition 210 can proceed with the same options as the third partition 208. If an application 126 is scheduled for execution, then processor 116 executes the application during the fourth partition (which can be a continuation from the third partition 208). If the application has completed executing during the third partition 208, then processor 116 executes the TDA 118 during the fourth partition 210 to collect and process the raw trace data.

Figure 3:
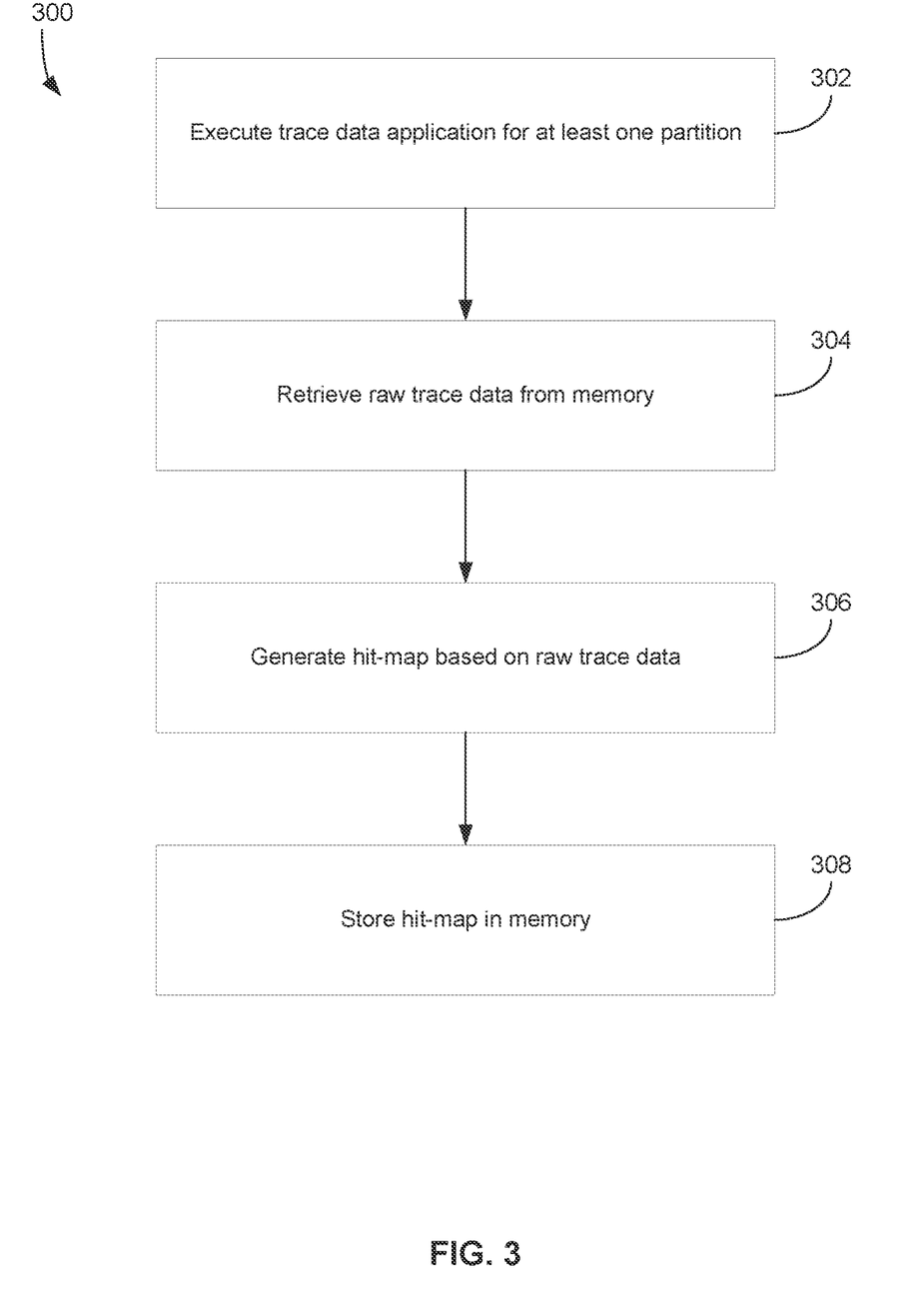
FIG. 3 depicts a flow diagram of an exemplary method for performing trace data analysis for at least one application, as described in one or more embodiments.

FIG. 3 depicts a flow diagram of an exemplary method for performing trace data analysis for at least one application. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner). Most standard exception handling is not described for case of explanation; however, it is to be understood that method 300 and the other methods presented herein can and typically would include such exception handling. Also, one or more aspects of method 300 and the other methods presented herein can be configurable or adaptive, either manually or in an automated manner.

Method 300 is described in the context of FIGS. 1-2. However, method 300 can be performed using other techniques. The blocks of method 300 are performed by processor 116 while executing TDA 118. In some examples, the entirety of method 300 is performed for a single partition.

Method 300 includes executing a trace data application for at least one partition of a plurality of partitions at block 302. For example, once processor 116 executes an application 126 for a first partition 204, processor 116 executes the TDA 118 during the second partition 206. Method 300 then proceeds to block 304 and retrieves the raw trace data from memory 120 during a second partition 206. For example, processor 116 is configured to retrieve the raw trace data from buffer 122 via communication bus 114.

Proceeding to block 306, method 300 generates a hit-map based on the raw trace data. A hit-map includes execution history information about the executable instructions in the application 126 being tested. In some examples, the hit-map is generated by examining the order of addresses in the raw trace data. If consecutive values in the raw trace data are also consecutive memory addresses, then the hit-map value for a respective application address is updated to reflect that the address was executed in the next consecutive order. Conversely, if consecutive values in the raw trace data are not consecutive memory addresses, then the hit-map value for a respective application address is updated to reflect that the branch corresponding to the respective application address was taken. To generate the hit-map, processor 116 processes the raw trace data during the second partition 206. Method 300 proceeds to block 308 and stores the generated hit-map in memory 120 during the second partition 206. For example, after generating the hit-map from the raw trace data, processor 116 sends the hit-map to memory 120 via communication bus 114. Memory 120 then stores the hit-map in storage medium 128, which can include any kind of suitable electronic storage circuitry (including circuitry that manages a database). By executing the TDA 118 during a spare partition when applications are not scheduled for execution, raw trace data can be processed in parallel without interrupting the scheduled execution of applications 126 on the processor 116.

When the hit-map is ready to be sent, processor 116 is configured to send the hit-map to a host system 124 via a communication link supported by the target. The host system 124 can use the hit-map to generate a structural coverage analysis (SCA) report. The SCA report provides an analysis of the execution of the corresponding application 126 and indicates what parts of the application 126 were executed during the testing process (which may be the entirety of the application or only a subset).

Figure 4:
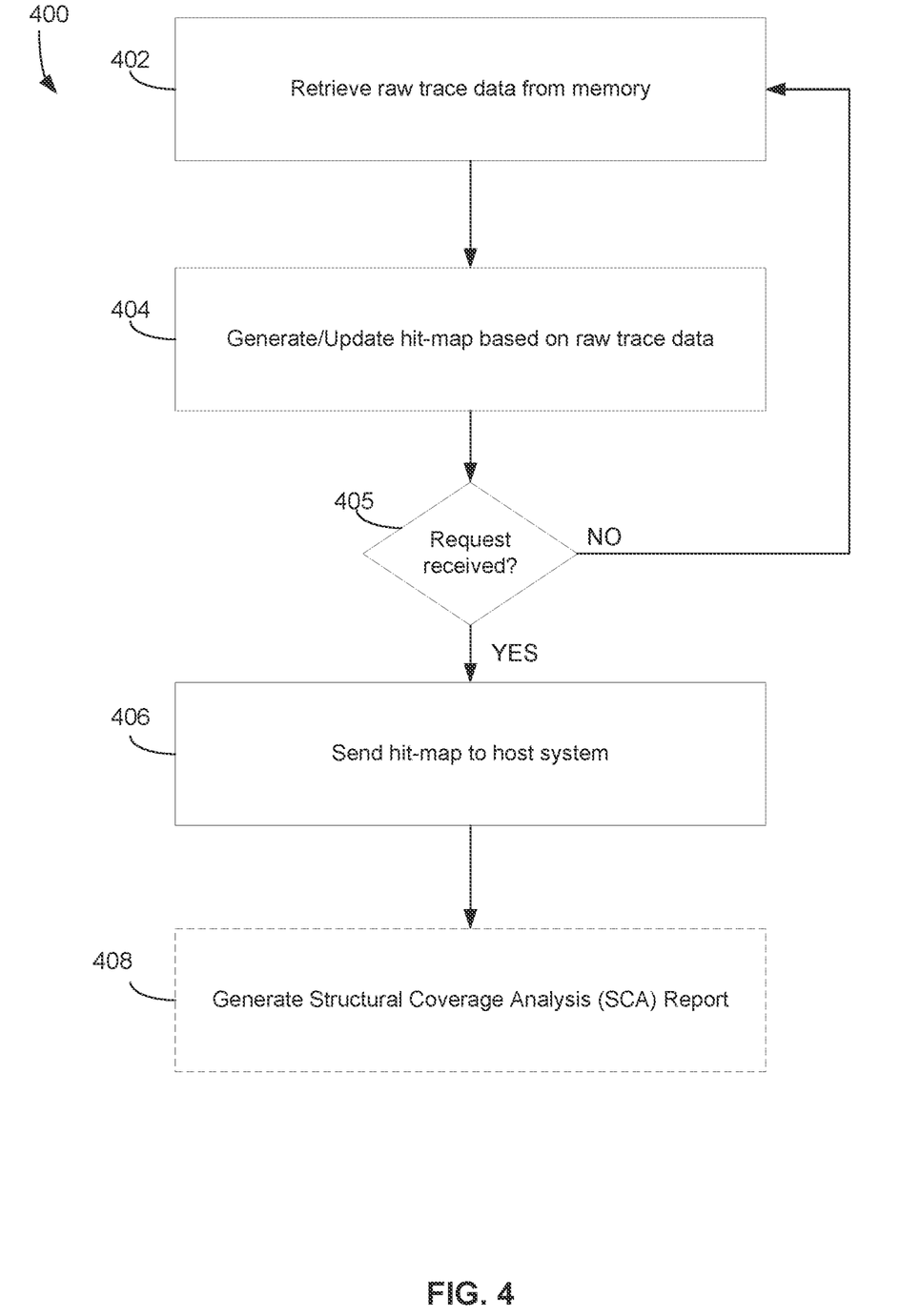
FIG. 4 depicts a flow diagram of an exemplary method for updating a hit-map based on additional raw trace data, as described in one or more embodiments.

FIG. 4 depicts a flow diagram of an exemplary method for updating a hit-map based on additional raw trace data. Method 400 can be implemented via FIGS. 1-2 and the execution of the TDA 118. In some examples, one or more blocks of method 400 can be used in combination with the processing associated with method 300.

Method 400 includes retrieving raw trace data from memory at block 402. The raw trace data is the trace data that is generated by the computing circuit 102 and stored in the buffer 122 of memory 120. The retrieval of the raw trace data is performed during a partition that follows the execution of an application; that is, a partition in which an application is not scheduled for execution. Method 400 then proceeds to block 404 and generates a hit-map based on the raw trace data, similarly as described in the context of FIG. 3. At block 405, method 400 determines if a request has been received from the host system to acquire the hit-map. If the request has not been received, then method 400 reverts back to block 402 and retrieves the raw trace data that corresponds to the subsequent execution of the application. As previously described, the retrieval of the raw trace data is performed during a spare partition in which the application is not scheduled for execution. Method 400 then proceeds to block 404 and updates the hit-map based on the newly acquired raw trace data when the application is not scheduled for execution. The hit-map can be repeatedly updated based on the raw trace data until the request is received at block 405.

When a request from the host system is received, method 400 proceeds to block 406 and sends the completed hit-map to the host system. The host system can then use the hit-map to generate a structural coverage analysis (SCA) report (block 408). Method 400 repeats the above functions for each application that requires structural coverage testing.

Example Embodiments

Example 1 includes a system, comprising: at least one processor coupled to a computing circuit, wherein the at least one processor is configured to execute at least a portion of at least one application for an execution cycle defined by a plurality of partitions, wherein the computing circuit is configured to generate first raw trace data that corresponds to trace information from executing the at least one application during a first partition of the plurality of partitions; a memory coupled to the at least one processor, wherein the memory is configured to store the first raw trace data; wherein the at least one processor is configured to execute a trace data analyzer application for at least one other partition of the plurality of partitions, wherein the at least one other partition is subsequent to the first partition, wherein by executing the trace data analyzer application, the at least one processor is configured, for the at least one other partition, to: retrieve the first raw trace data stored in the memory; generate a hit-map based on the first raw trace data; and store the hit-map in the memory.

Example 2 includes the system of Example 1, wherein the memory comprises a storage medium and a buffer, wherein by executing the trace data analyzer application, the at least one application is configured to, during the at least one other partition: retrieve the first raw trace data from the buffer; and store the hit-map in the storage medium.

Example 3 includes the system of any of Examples 1-2, wherein the hit-map comprises execution history information about executable instructions in the at least one application determined from the first raw trace data.

Example 4 includes the system of any of Examples 1-3, wherein the at least one processor is configured to send the hit-map to a host system upon receiving a request from the host system.

Example 5 includes the system of any of Examples 1-4, wherein the at least one other partition comprises a second partition adjacent in time to the first partition, wherein the at least one processor is configured to execute the trace data analyzer application during the second partition.

Example 6 includes the system of Example 5, comprising a third partition adjacent in time to the second partition, wherein the at least one processor is configured to execute the at least one application during the third partition, wherein the computing circuit is configured to generate second raw trace data that corresponds to trace information from executing the at least one application during the third partition.

Example 7 includes the system of Example 6, wherein the at least one other partition comprises a fourth partition adjacent in time to the third partition, wherein the at least one processor is configured to execute the trace data analyzer application during the fourth partition, wherein by executing the trace data analyzer application, the at least one processor is configured, for the fourth partition, to: retrieve the second raw trace data stored in the memory; update the hit-map based on the second raw trace data; and store the updated hit-map in the memory.

Example 8 includes a method, comprising: executing, during a first partition of a plurality of partitions, at least a portion of at least one application; executing a trace data analyzer application for at least one other partition of the plurality of partitions subsequent to the first partition, wherein executing the trace data analyzer application comprises: retrieving first raw trace data that corresponds to trace information from executing the at least one application during the first partition; generating a hit-map for the at least one application based on the first raw trace data; and storing the hit-map in a memory.

Example 9 includes the method of Example 8, wherein the memory comprises a storage medium and a buffer, and further comprising, during the at least one other partition: retrieving the first raw trace data from the buffer; and storing the hit-map in the storage medium.

Example 10 includes the method of any of Examples 8-9, the hit-map comprises execution history information about executable instructions in the at least one application determined from the raw trace data.

Example 11 includes the method of any of Examples 8-10, comprising sending the hit-map to a host system upon receiving a request from the host system.

Example 12 includes the method of any of Examples 8-11, wherein the at least one other partition comprises a second partition adjacent in time to the first partition, and comprising executing the trace data analyzer application during the second partition.

Example 13 includes the method of Example 12, comprising: executing the at least one application during a third partition adjacent in time to the second partition; and acquiring second raw trace data that corresponds to trace information from executing the at least one application during the third partition.

Example 14 includes the method of Example 13, comprising, for a fourth partition adjacent in time to the third partition, retrieving the second raw trace data; updating the hit-map based on the second raw trace data; and storing the updated hit-map in the memory.

Example 15 includes a program product comprising a non-transitory computer readable medium having program instructions stored thereon, wherein when executed by at least one processor, the program instructions cause the at least one processor to: execute, for a first partition of a plurality of partitions, at least a portion of at least one application; execute a trace data analyzer application for at least one other partition of the plurality of partitions, wherein executing the trace data analyzer application causes the at least one processor to: retrieve first raw trace data that corresponds to trace information from executing the at least one application during the first partition; generate a hit-map based on the first raw trace data; and store the hit-map in a memory.

Example 16 includes the program product of Example 15, wherein the memory comprises a storage medium and a buffer, and wherein the program instructions cause the at least one processor to, during the at least one other partition: retrieve the first raw trace data from the buffer; and store the hit-map in the storage medium.

Example 17 includes the program product of any of Examples 15-16, wherein the hit-map comprises execution history information about executable instructions in the at least one application determined from the raw trace data.

Example 18 includes the program product of any of Examples 15-17, wherein the at least one other partition comprises a second partition adjacent in time to the first partition, and wherein the program instructions cause the at least one processor to execute the trace data analyzer application during the second partition.

Example 19 includes the program product of Example 18, wherein the program instructions cause the at least one processor to: execute the at least one application during a third partition adjacent in time to the second partition; and acquire second raw trace data that corresponds to trace information from executing the at least one application during the third partition.

Example 20 includes the program product of Example 19, wherein the program instructions cause the at least one processor to, for a fourth partition adjacent in time to the third partition, retrieve the second raw trace data; update the hit-map based on the second raw trace data; and store the updated hit-map in the memory.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:
at least one processor coupled to a computing circuit, wherein the at least one processor is configured to execute, during a first partition of a plurality of partitions, at least a portion of at least one application for an execution cycle defined by the plurality of partitions, wherein the computing circuit is configured to generate first raw trace data that corresponds to trace information from executing the at least one application during the first partition of the plurality of partitions, wherein the execution cycle is a timing interval in which application-specific functions of the at least one application are executed for at least one partition of the plurality of partitions, and wherein each partition of the plurality of partitions is a sub-interval of time of the execution cycle; and
a memory coupled to the at least one processor, wherein the memory is configured to store the first raw trace data,
wherein the at least one processor is further configured to execute a trace data analyzer application for at least one other partition of the plurality of partitions,
wherein the at least one other partition of the plurality of partitions is subsequent to the first partition of the plurality of partitions, and
wherein by executing the trace data analyzer application, the at least one processor is further configured, for the at least one other partition of the plurality of partitions, to:
retrieve the first raw trace data stored in the memory;
generate a hit-map for the at least one application based on the first raw trace data; and
store the hit-map in the memory.

2. The system of claim 1, wherein the memory comprises a non-transitory storage medium and a buffer, and wherein by executing the trace data analyzer application, the at least one application is configured to, during the at least one other partition of the plurality of partitions:
retrieve the first raw trace data from the buffer; and
store the hit-map in the non-transitory storage medium.

3. The system of claim 1, wherein the hit-map comprises execution history information about executable instructions in the at least one application determined from the first raw trace data.

4. The system of claim 1, wherein the at least one processor is further configured to send the hit-map to a host system upon receiving a request from the host system.

5. The system of claim 1, wherein the at least one other partition of the plurality of partitions comprises a second partition of the plurality of partitions adjacent in time to the first partition of the plurality of partitions, and wherein the at least one processor is further configured to execute the trace data analyzer application during the second partition of the plurality of partitions.

6. The system of claim 5, further comprising a third partition of the plurality of partitions adjacent in time to the second partition of the plurality of partitions, wherein the at least one processor is further configured to execute the at least one application during the third partition of the plurality of partitions, and wherein the computing circuit is further configured to generate second raw trace data that corresponds to trace information from executing the at least one application during the third partition of the plurality of partitions.

7. The system of claim 6, wherein the at least one other partition of the plurality of partitions comprises a fourth partition of the plurality of partitions adjacent in time to the third partition of the plurality of partitions, wherein the at least one processor is further configured to execute the trace data analyzer application during the fourth partition of the plurality of partitions, and
wherein by executing the trace data analyzer application, the at least one processor is further configured, for the fourth partition of the plurality of partitions, to:
retrieve the second raw trace data stored in the memory;
update the hit-map based on the second raw trace data; and
store the updated hit-map in the memory.

8. A method, comprising:
executing, during a first partition of a plurality of partitions, at least a portion of at least one application for an execution cycle defined by the plurality of partitions, wherein each partition of the plurality of partitions is a sub-interval of time of the execution cycle, and wherein the execution cycle is a timing interval in which application-specific functions of the at least one application are executed for at least one partition of the plurality of partitions; and
executing a trace data analyzer application for at least one other partition of the plurality of partitions subsequent to the first partition of the plurality of partitions, wherein executing the trace data analyzer application comprises:
retrieving first raw trace data that corresponds to trace information and is generated from executing the at least one application during the first partition of the plurality of partitions;
generating a hit-map for the at least one application based on the first raw trace data; and
storing the hit-map in a memory.

9. The method of claim 8, wherein the memory comprises a non-transitory storage medium and a buffer, and further comprising, during the at least one other partition of the plurality of partitions:
retrieving the first raw trace data from the buffer; and
storing the hit-map in the non-transitory storage medium.

10. The method of claim 8, wherein the hit-map comprises execution history information about executable instructions in the at least one application determined from the first raw trace data.

11. The method of claim 8, further comprising sending the hit-map to a host system upon receiving a request from the host system.

12. The method of claim 8, wherein the at least one other partition of the plurality of partitions comprises a second partition of the plurality of partitions adjacent in time to the first partition of the plurality of partitions, and further comprising executing the trace data analyzer application during the second partition of the plurality of partitions.

13. The method of claim 12, further comprising:
executing the at least one application during a third partition of the plurality of partitions adjacent in time to the second partition of the plurality of partitions; and
acquiring second raw trace data that corresponds to trace information from executing the at least one application during the third partition of the plurality of partitions.

14. The method of claim 13, further comprising, for a fourth partition of the plurality of partitions adjacent in time to the third partition of the plurality of partitions,
retrieving the second raw trace data;
updating the hit-map based on the second raw trace data; and
storing the updated hit-map in the memory.

15. A computer program product comprising a non-transitory computer readable storage medium having program instructions stored thereon, wherein when executed by at least one processor, the program instructions cause the at least one processor to:
execute, during a first partition of a plurality of partitions, at least a portion of at least one application for an execution cycle defined by the plurality of partitions, wherein each partition of the plurality of partitions is a sub-interval of time of the execution cycle, and wherein the execution cycle is a timing interval in which application-specific functions of the at least one application are executed for at least one partition of the plurality of partitions; and
execute a trace data analyzer application for at least one other partition of the plurality of partitions subsequent to the first partition of the plurality of partitions, wherein executing the trace data analyzer application causes the at least one processor to:
retrieve first raw trace data that corresponds to trace information and is generated from executing the at least one application during the first partition of the plurality of partitions;
generate a hit-map for the at least one application based on the first raw trace data; and
store the hit-map in a memory.

16. The computer program product of claim 15, wherein the memory comprises a non-transitory storage medium and a buffer, and wherein the program instructions further cause the at least one processor to, during the at least one other partition of the plurality of partitions:
retrieve the first raw trace data from the buffer; and
store the hit-map in the non-transitory storage medium.

17. The computer program product of claim 15, wherein the hit-map comprises execution history information about executable instructions in the at least one application determined from the first raw trace data.

18. The computer program product of claim 15, wherein the at least one other partition of the plurality of partitions comprises a second partition of the plurality of partitions adjacent in time to the first partition of the plurality of partitions, and wherein the program instructions further cause the at least one processor to execute the trace data analyzer application during the second partition of the plurality of partitions.

19. The computer program product of claim 18, wherein the program instructions further cause the at least one processor to:
execute the at least one application during a third partition of the plurality of partitions adjacent in time to the second partition of the plurality of partitions; and
acquire second raw trace data that corresponds to trace information from executing the at least one application during the third partition of the plurality of partitions.

20. The computer program product of claim 19, wherein the program instructions further cause the at least one processor to, for a fourth partition of the plurality of partitions adjacent in time to the third partition of the plurality of partitions,
retrieve the second raw trace data;
update the hit-map based on the second raw trace data; and
store the updated hit-map in the memory.

* * * * *